US012075948B2

(12) United States Patent
De Vitis et al.

(10) Patent No.: US 12,075,948 B2
(45) Date of Patent: Sep. 3, 2024

(54) APPARATUSES AND METHODS FOR IMPROVED INGREDIENT DISPENSING

(71) Applicant: DoorDash, Inc., San Francisco, CA (US)

(72) Inventors: Brian Michael De Vitis, Kenmore, WA (US); Kort Edward Reinecke, Seattle, WA (US); Naikang Kuan, Castro Valley, CA (US)

(73) Assignee: DoorDash, Inc., San Francisco, CA (US)

( * ) Notice: Subject to any disclaimer, the term of this patent is extended or adjusted under 35 U.S.C. 154(b) by 166 days.

(21) Appl. No.: 17/838,880

(22) Filed: Jun. 13, 2022

(65) Prior Publication Data

US 2023/0397770 A1    Dec. 14, 2023

(51) Int. Cl.
| A47J 47/01 | (2006.01) |
| B65G 1/04 | (2006.01) |
| B67D 3/00 | (2006.01) |

(52) U.S. Cl.
CPC .............. *A47J 47/01* (2013.01); *B65G 1/045* (2013.01); *B67D 3/0029* (2013.01); *B67D 3/0083* (2013.01)

(58) Field of Classification Search
CPC ..... G07F 13/06; B67D 3/0029; B67D 3/0083; B67D 3/225; B01F 33/841
USPC .......................................... 141/103–104, 144
See application file for complete search history.

(56) References Cited

U.S. PATENT DOCUMENTS

| 4,503,502 | A |  | 3/1985 | Chapin |
| 4,748,902 | A |  | 6/1988 | Maurantonio |
| 10,232,330 | B2 | * | 3/2019 | Macedo ............. B01F 35/7174 |
| 10,813,503 | B2 |  | 10/2020 | Kathirasen et al. |
| 11,284,748 | B2 |  | 3/2022 | Sekar et al. |
| 11,625,970 | B2 | * | 4/2023 | Anziano ................ A23G 9/228 |
|  |  |  |  | 99/455 |
| 2016/0067866 | A1 |  | 3/2016 | Sekar et al. |
| 2020/0296977 | A1 |  | 9/2020 | Anderson et al. |
| 2020/0297164 | A1 |  | 9/2020 | Anderson et al. |
| 2021/0000300 | A1 |  | 1/2021 | Sekar et al. |
| 2021/0000301 | A1 |  | 1/2021 | Kathirasen et al. |
| 2021/0321826 | A1 |  | 10/2021 | Bhat et al. |
| 2021/0345833 | A1 |  | 11/2021 | Sekar et al. |

* cited by examiner

*Primary Examiner* — Timothy L Maust
(74) *Attorney, Agent, or Firm* — Kilpatrick Townsend & Stockton LLP

(57) ABSTRACT

A system includes a carousel apparatus including: first openings concentrically arranged around axis to hold first containers adapted to hold first food ingredients, second openings concentrically arranged inside the first openings to hold second containers adapted to hold second food ingredients, a holder in which the first openings and the second openings are formed, and which is adapted to support the first containers and the second containers, and a first motor coupled to the holder and adapted to rotate the holder around the axis; support structure configured to hold a receptacle; and a linear actuator apparatus configured to move the support structure and including: a linear guide which extends underneath the holder and is coupled to the support structure, and a second motor coupled to the linear guide and adapted to move the support structure along the linear guide underneath the first openings and the second openings.

22 Claims, 10 Drawing Sheets

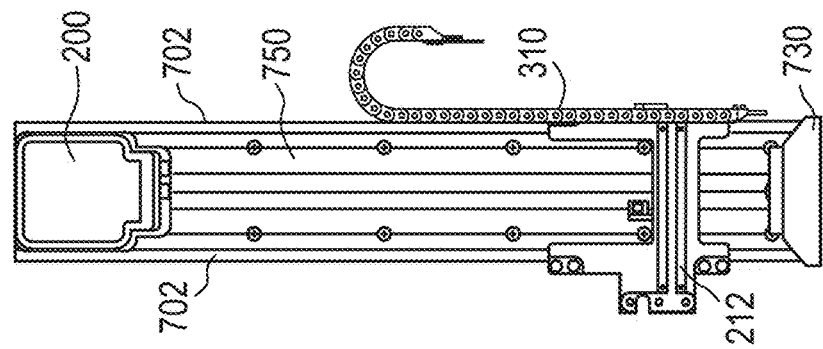
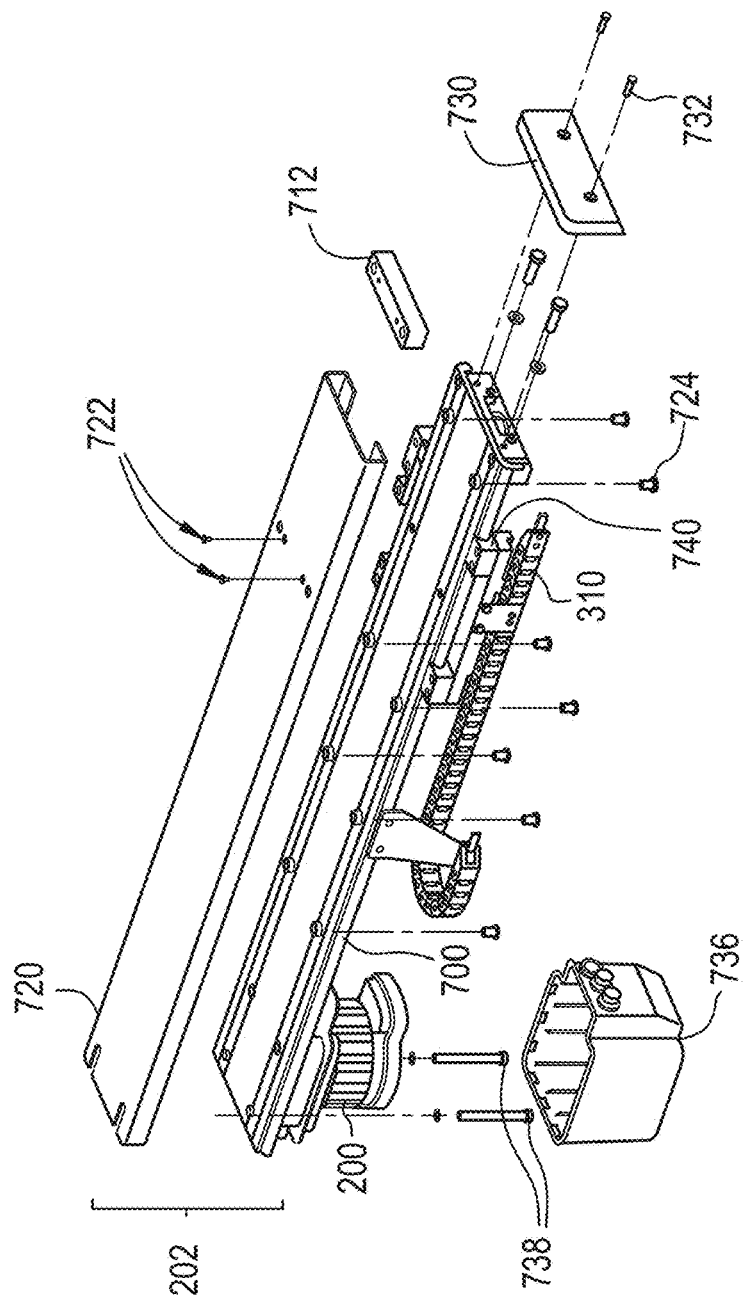

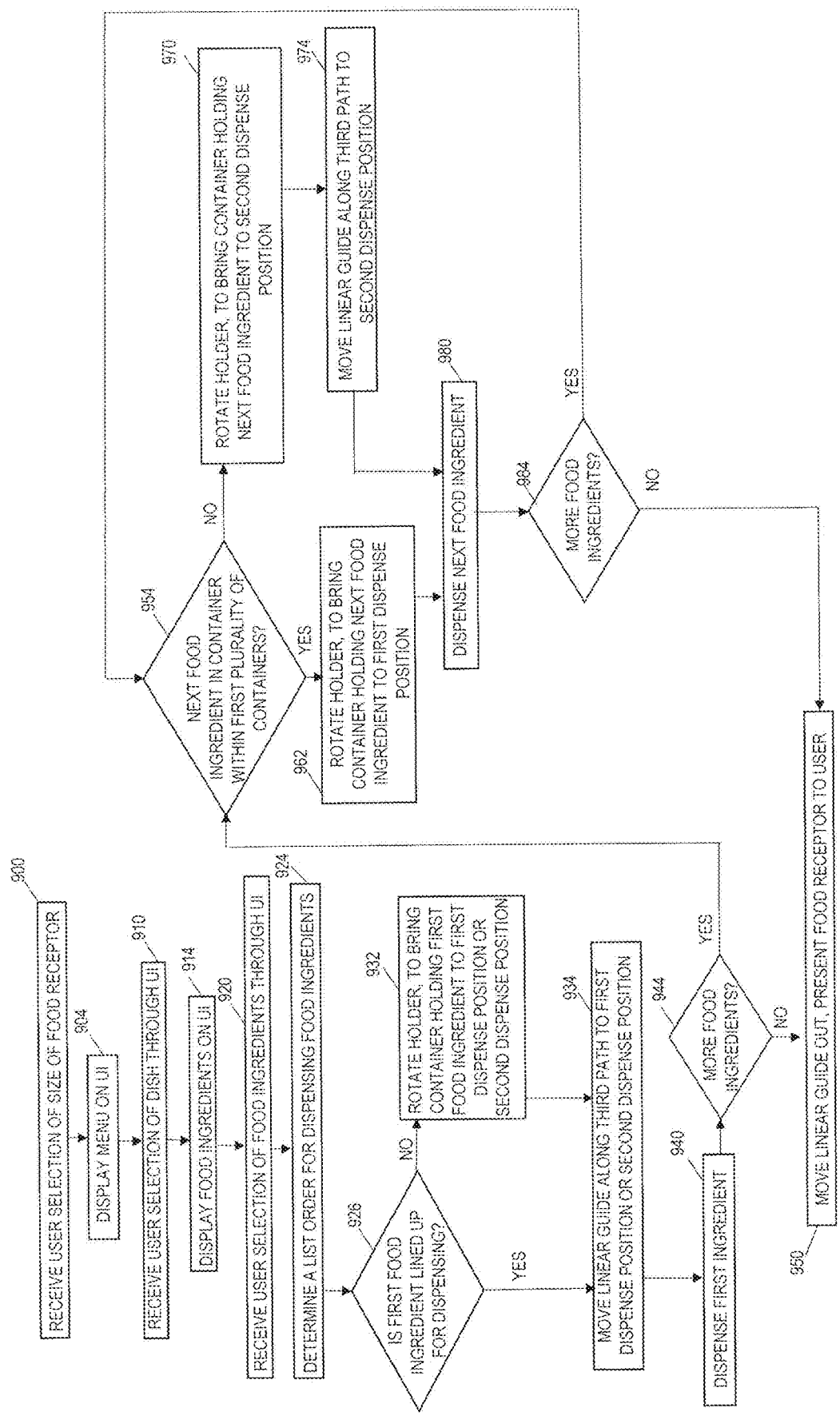

APPARATUSES AND METHODS FOR IMPROVED INGREDIENT DISPENSING

BACKGROUND

The application relates to apparatuses and methods for dispensing food ingredients, and, more specifically, to apparatuses and methods for dispensing food ingredients using limited number of axes.

It may be challenging to configure an automated food dispensing apparatus to dispense food ingredients in a distributed manner so that a final dish presentation is appetizing to the end user. Automated food dispensers that lump food ingredients together may cause the food to be unappetizing and may impact the taste of the food. Likewise, automated food preparation apparatuses that lump food ingredients together are more likely to cause food to fall outside of the bowl, leading to waste in revenue, resources, and need for the staff to clean the apparatus.

For example, a one axis robot which uses a carousel to locate ingredient hoppers over a bowl and dispense an appropriate ingredient into the bowl may have two fixed dispense points and a single bowl location where the dispensing of the food is performed from both dispense points into the bowl located at the bowl location. This might result in the food ingredients being dispensed on the opposing sides with respect to the bowl, and on top of one another. Accordingly, two piles of ingredients are formed, thus creating the unpleasant presentation for the customer. Further, the food tends to spill over.

In another example, a carousel and a rotary axis rotate the bowl in and place the bowl under the ingredient hoppers and then rotate the bowl out, to the user, for the user to pick up. Although this is a two axes solution, it suffers from a limited positioning capability for dispensing food.

Likewise, it is difficult to control where the food lands in the bowl and, thus, the size of the bowl needs to be a controlled parameter. For example, the bowl needs to be large enough to prevent spilling of food outside the bowl.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

In accordance with an embodiment, a system includes: a carousel apparatus including: a first plurality of openings concentrically arranged around an axis and adapted to hold a first plurality of containers, respectively, the first plurality of containers being adapted to hold first food ingredients, a second plurality of openings concentrically arranged inside the first plurality of openings and adapted to hold a second plurality of containers, respectively, the second plurality of containers being adapted to hold second food ingredients, a holder in which the first plurality of openings and the second plurality of openings are formed, and which is adapted to support the first plurality of containers and the second plurality of containers, and a first motor coupled to the holder and adapted to rotate the holder around the axis; a support structure configured to hold a receptacle; and a linear actuator apparatus configured to move the support structure and including: a linear guide which extends underneath the holder and is coupled to the support structure, and a second motor coupled to the linear guide and adapted to move the support structure along the linear guide underneath the first plurality of openings and the second plurality of openings.

In accordance with an embodiment, a method for using a system is provided, the system including: a carousel apparatus including: a first plurality of openings concentrically arranged around an axis and adapted to hold a first plurality of containers, respectively, the first plurality of containers being adapted to hold first food ingredients, a second plurality of openings concentrically arranged inside the first plurality of openings and adapted to hold a second plurality of containers, respectively, the second plurality of containers being adapted to hold second food ingredients, a holder in which the first plurality of openings and the second plurality of openings are formed, and which is adapted to support the first plurality of containers and the second plurality of containers, and a first motor coupled to the holder and adapted to rotate the holder around the axis; a support structure configured to hold a receptacle; and a linear actuator apparatus configured to move the support structure and including: a linear guide which extends underneath the holder and is coupled to the support structure, and a second motor coupled to the linear guide and adapted to move the support structure along the linear guide underneath the first plurality of openings and the second plurality of openings, the method including: rotating, by the first motor, the holder around the axis; and moving, by the second motor, the support structure holding the receptacle along the linear guide underneath the first plurality of openings and the second plurality of openings.

BRIEF DESCRIPTION OF THE DRAWINGS

The above and/or other aspects, features and advantages of certain embodiments will be more apparent from the following detailed description, taken in conjunction with the accompanying drawings, in which:

FIG. 7A illustrates a perspective view of a portion of a linear actuator apparatus of the food distribution system according to an embodiment;

FIG. 7B illustrates a bottom view of a portion of the linear actuator apparatus of the food distribution system according to an embodiment;

FIG. 9 illustrates a flowchart of a method for using a food distribution system according to an embodiment.

DETAILED DESCRIPTION

Recently, research and development have been conducted to automate the food preparation process and automatically hand the prepared food to a consumer. Typically, the consumer wants to buy food that looks attractive and appetizing. Ingredient distribution plays a role in how the consumer perceives the food. Some arranged dishes, such as cobb salad or bibimbap, must have ingredients placed in a controlled manner without mixing. Additionally, the food distribution may improve the taste of the food. For example, in the case of a salad, if the food ingredients are unevenly distributed or overflowing the bowl, the consumer may perceive the food product as looking unappetizing. In addition, if the food distribution is sloppy, it may lead to food falling outside of the bowl and/or the bowl may tip over and fall. This leads to waste in revenue and resources, and additionally is cumbersome to the staff and the customers, as for example, requiring more cleaning and/or maintenance. In this case, apparatus may be offline for a prolonged time.

Figure 1:
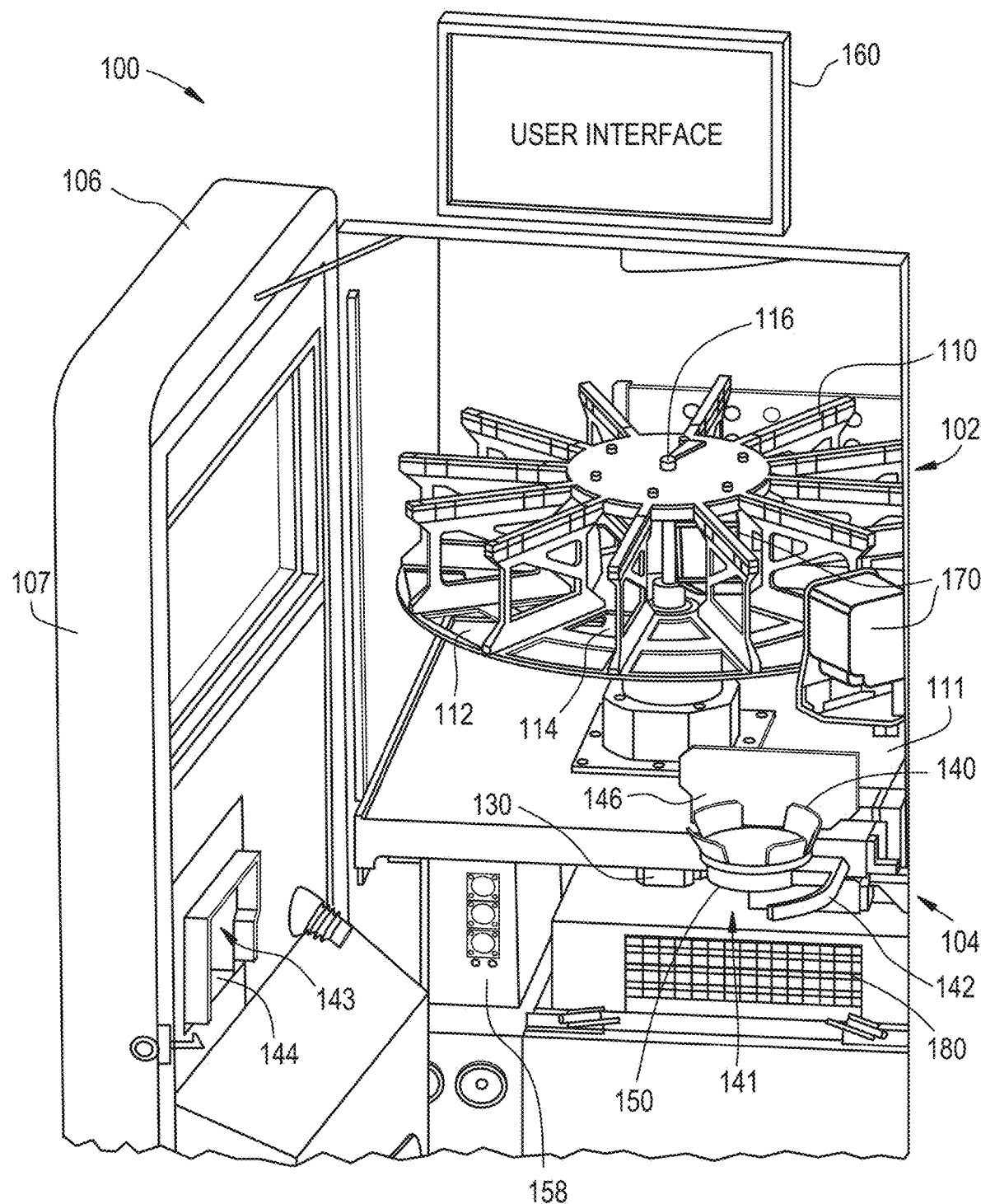
FIG. 1 illustrates a food distribution system according to an embodiment.
Figure 2A:
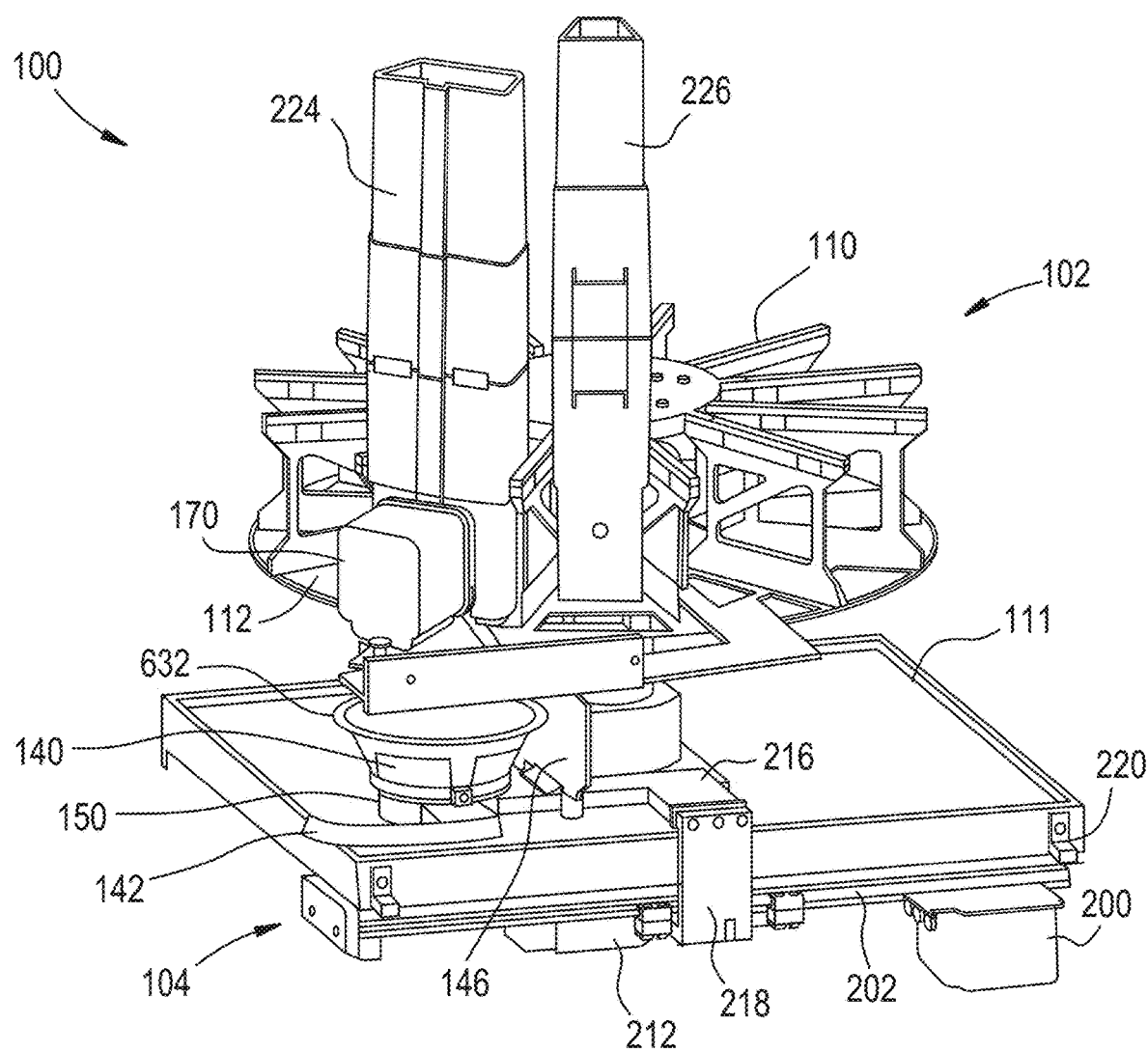
FIG. 2A illustrates a portion of the food distribution system according to an embodiment.
Figure 2B:
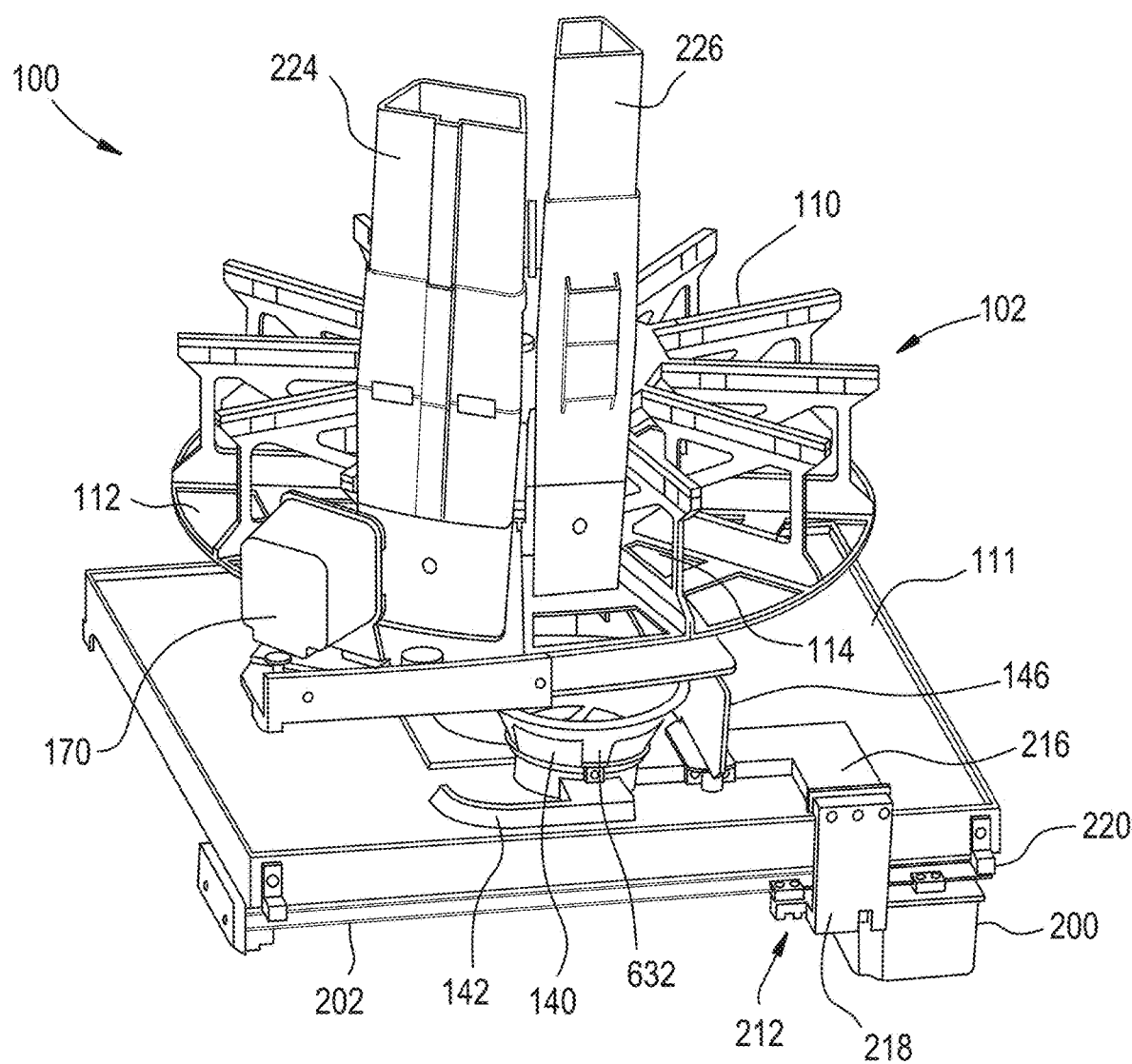
FIG. 2B illustrates a portion of the food distribution system according to an embodiment.
Figure 3:
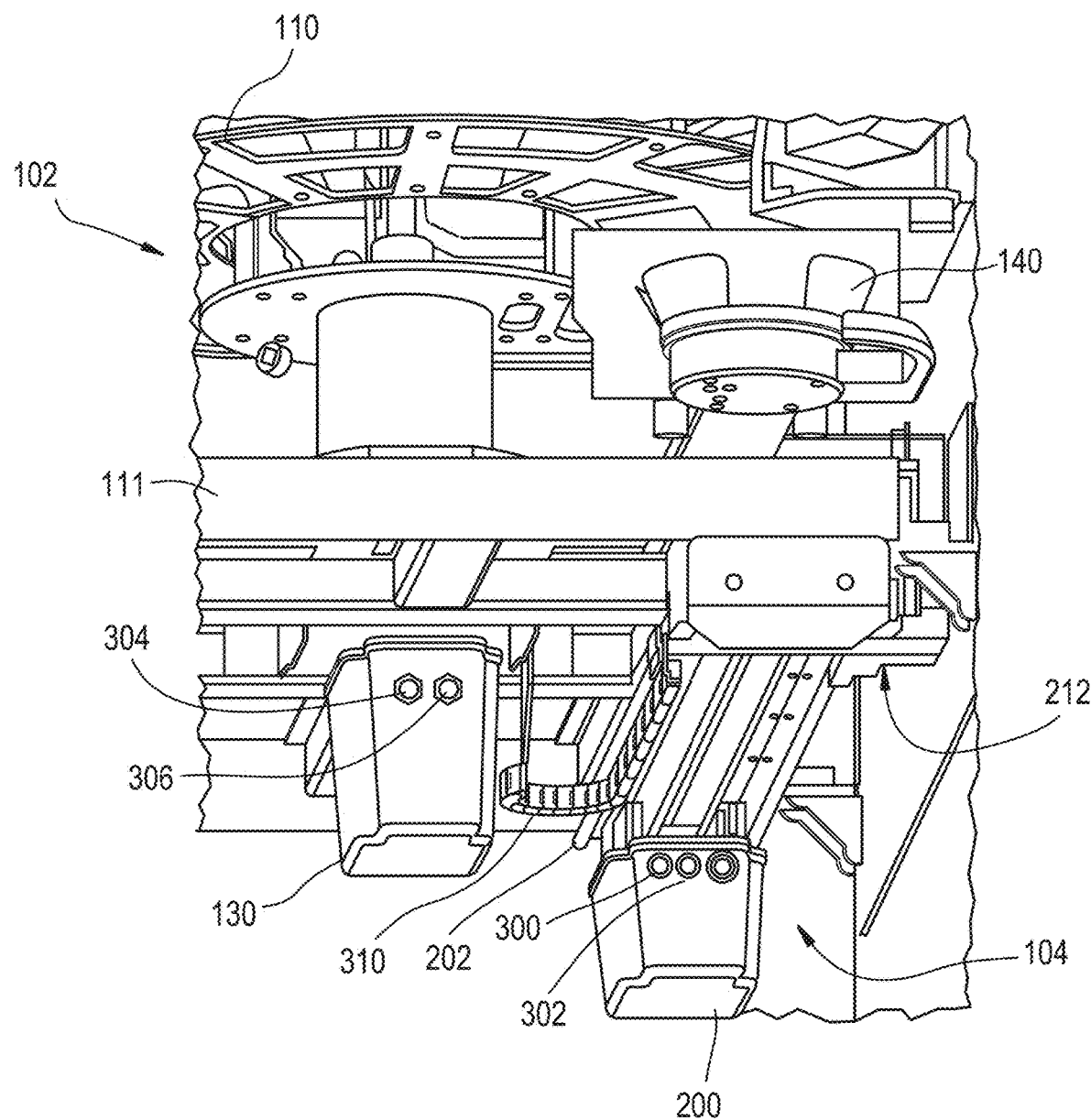
FIG. 3 illustrates a portion of the food distribution system according to an embodiment.
Figure 4:
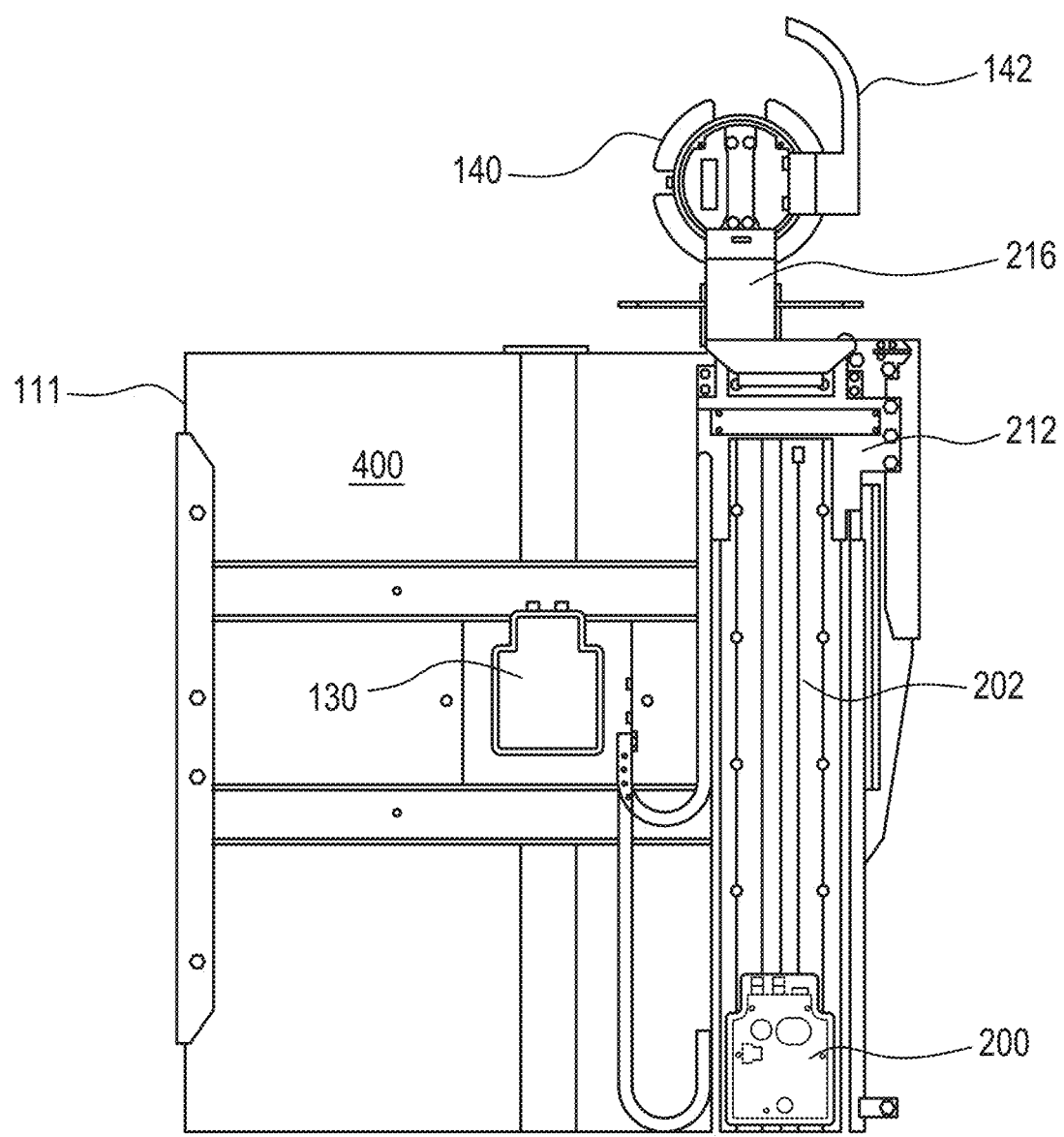
FIG. 4 illustrates a bottom view of a portion of the food distribution system according to an embodiment.
Figure 5:
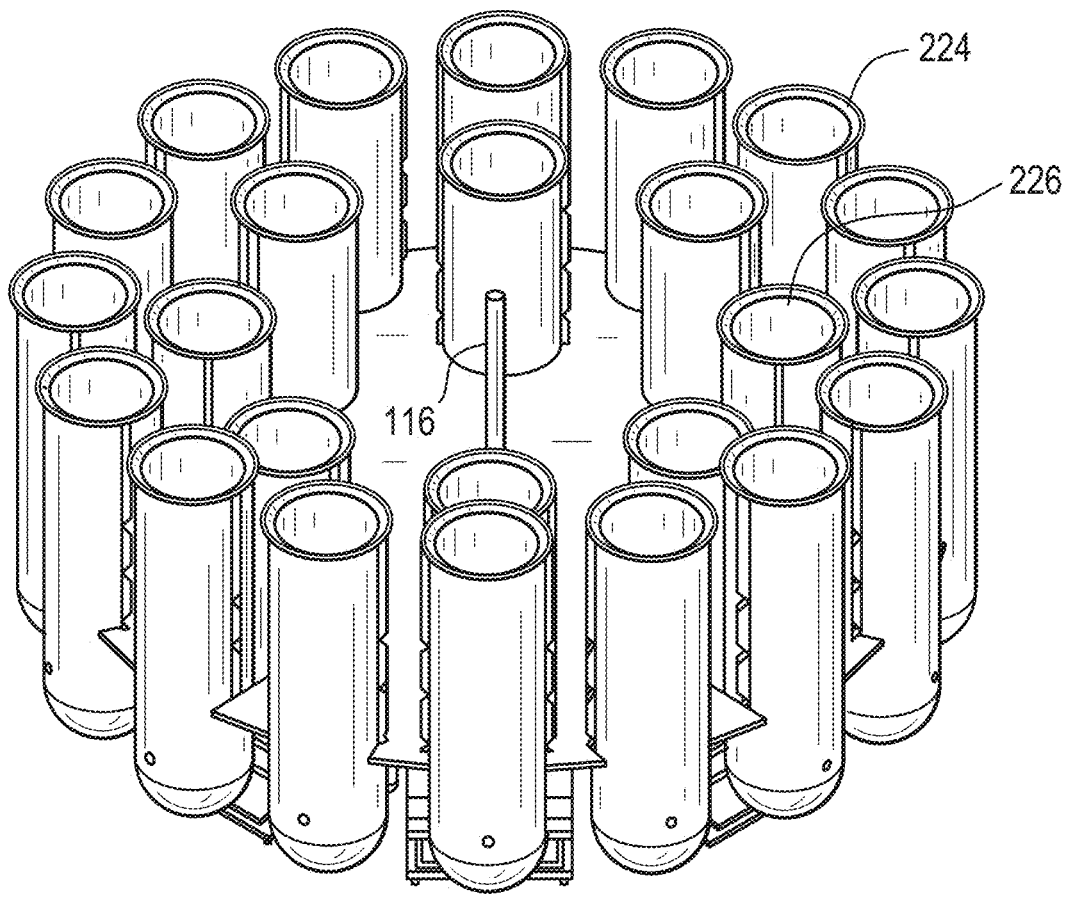
FIG. 5 illustrates a portion of the food distribution system according to an embodiment.
Figure 6:
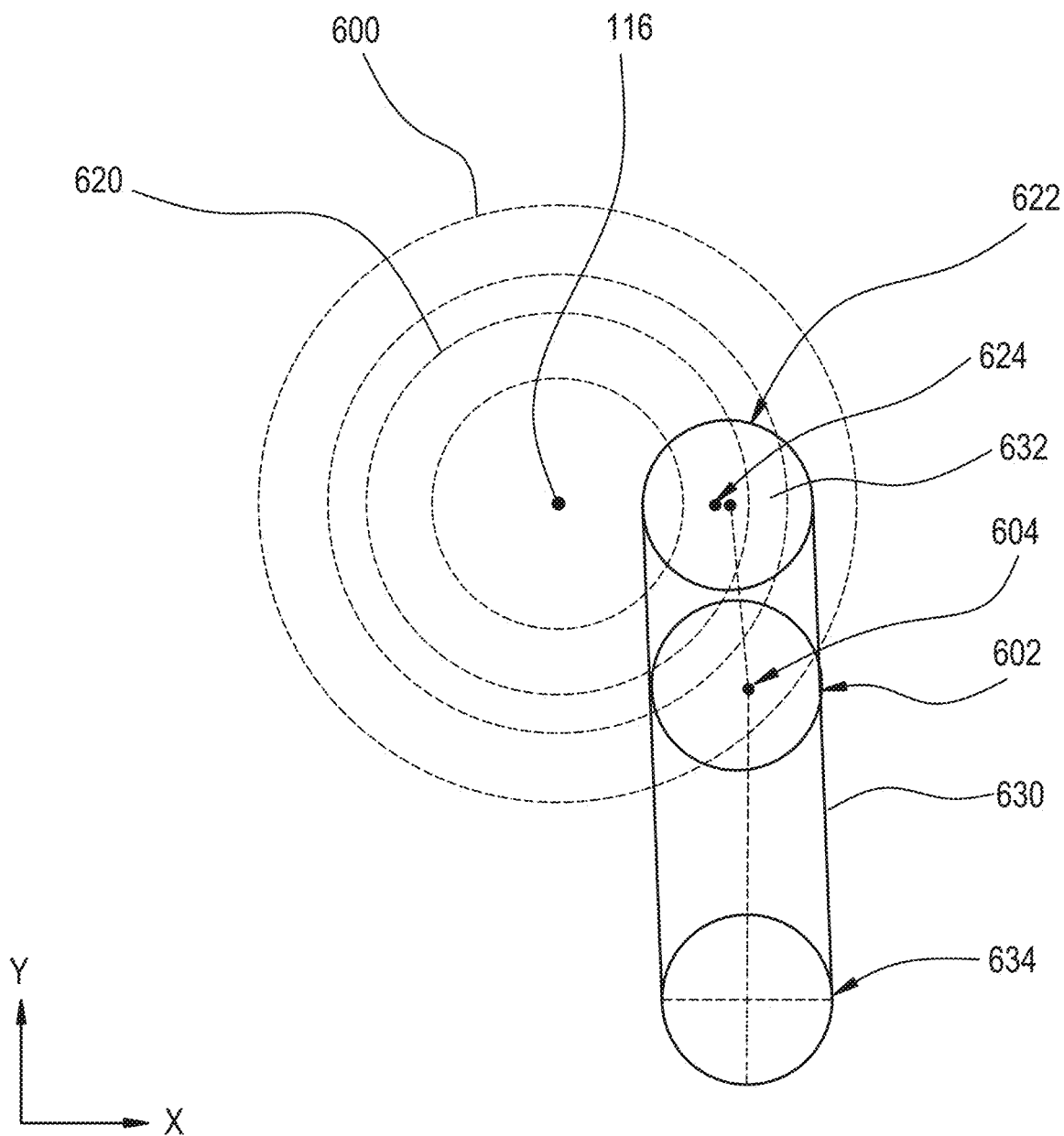
FIG. 6 illustrates a diagram of moving paths of components of the food distribution system according to an embodiment.

FIG. 1 illustrates a food distribution system according to an embodiment, FIG. 2A illustrates a portion of the food distribution system according to an embodiment, FIG. 2B illustrates a portion of the food distribution system according to an embodiment, FIG. 3 illustrates a portion of the food distribution system according to an embodiment, FIG. 4 illustrates a bottom view of a portion of the food distribution system according to an embodiment, FIG. 5 illustrates a portion of the food distribution system according to an embodiment, and FIG. 6 illustrates a diagram of moving paths of components of the food distribution system according to an embodiment.

With reference to FIGS. 1, 2A, and 2B, a food distribution system 100, e.g., a system, includes a carousel apparatus 102 and a linear actuator apparatus 104. The carousel apparatus 102 and the linear actuator apparatus 104 are housed in a housing 106, e.g., a cabinet or an enclosure, which has a housing door 107 to cover the space inside the housing 106. For illustrative purposes, the housing door 107 is shown open in FIG. 1.

The carousel apparatus 102 includes a holder 110 attached to a shaft 116 and supported by a table 111, e.g., a table structure having a planar top portion. A first plurality of openings 112, e.g., outer openings, and a second plurality of openings 114, e.g., inner openings, are formed in the holder 110. The first plurality of openings 112 is concentrically arranged at an outer periphery of the holder 110 around an axis coinciding with the shaft 116 and adapted to hold outer containers storing various food items, e.g., food ingredients. The first plurality of openings 112 surrounds the second plurality of openings 114 concentrically arranged closer to the shaft 116. The second plurality of openings 114 is adapted to hold inner containers storing various food items, e.g., food ingredients. Each of the second plurality of openings 114 has a cross-section smaller than a cross-section of each of the first plurality of openings 112.

A first motor 130 is coupled to the holder 110 via the shaft 116 and adapted to rotate the holder 110 around the axis extending through the shaft 116 so that the food which is held in the outer containers and the inner containers is dispensed to the user using a receptacle 140 supported by a support structure 141.

A protruding structure 142, e.g., an arm, is connected to the support structure 141 and extends in a forward direction toward an exterior of the housing 106. The protruding structure 142 is adapted to push open an access door 143 which is attached to the housing door 107 at the exterior of the housing 106 and covers an opening 144 formed in the housing door 107. The user may pick-up the food order when the receptacle 140 is brought out through the opening 144. For illustrative purposes, the access door 143 is shown open in FIG. 1.

A shielding plate 146 installed behind the receptacle 140 conforms in size to the opening 144 and is configured to block the space behind the receptacle 140 so that the user is prevented from reaching inside the machinery when the opening 144 is uncovered from an outside, e.g., when the access door 143 is open by being pushed by the protruding structure 142.

A load cell is disposed in a load cell housing 150 underneath the receptacle 140 and configured to provide a weight measurement of the object causing a load on the load cell. For example, the object may be receptacle 140, a food receptor placed in the receptacle 140, a food ingredient dispensed into the food receptor, etc.

A controller 158 including one or more processors or microprocessors controls the operations of the food distribution system 100 and is coupled to a user interface (UI) 160 which displays various information and receives inputs of a user, e.g., a consumer. The UI 160 may include a display and a user input unit including a button, a touch pad, etc. In an embodiment, the UI 160 may be a touch screen configured to display information and receive inputs of the user. As another example, the UI 160 may display promotional materials and operator and cleaning instructions (while in operator mode).

The food distribution system 100 further includes one or more dispensing motors 170 for dispensing the food ingredients from the outer containers and the inner containers. For example, one of the dispensing motors 170, e.g., a first dispensing motor, which is disposed at an outer side of the carousel apparatus 102 may dispense the food ingredients from the outer containers. Another one of the dispensing motors 170, e.g., a second dispensing motor, which is disposed at an inner side of the carousel apparatus 102 may dispense the food ingredients from the inner containers.

A cooling unit 180 for maintaining a temperature appropriate for the food ingredients may be provided inside the housing 106.

With continued reference to FIGS. 1, 2A, and 2B, and further reference to FIG. 3, the linear actuator apparatus 104 includes a second motor 200 coupled to a linear guide 202, which extends underneath the holder 110.

The support structure 141 is configured to support the receptacle 140 and includes a carriage 212 coupled to the linear guide 202. The second motor 200 is adapted to move the carriage 212, which is connected to the receptacle 140, underneath the first plurality of openings 112 and the second plurality of openings 114 using the linear guide 202. The support structure 141 further includes a bracket 216 connecting the support structure 141 to an arm 218 which connects the support structure 141 and the linear guide 202, e.g., the arm 218 connects the support structure 141 and the carriage 212. For example, the arm 218 is proximate to an edge of the table 111, e.g., extends along the edge of the table structure. A bracket or brackets 220 affix the table 111 to the housing 106.

FIGS. 2A and 2B show that the holder 110 includes the first plurality of openings 112 and the second plurality of openings 114. The first plurality of openings 112 is adapted to hold a first plurality of containers 224, e.g., outer containers. The second plurality of openings 114 is adapted to hold a second plurality of containers 226, e.g., inner containers.

The first motor 130 is adapted to rotate the holder 110 around the axis extending through the shaft 116 so that the solid food ingredients or beverage ingredients which are held in the first plurality of containers 224 and/or the second plurality of containers 226 is dispensed according to the user's order into a food receptor 632 placed in the receptacle 140 which may be moved by the support structure 141, as described above.

As illustrated in FIG. 3, sockets 300 and 302 are provided on a side of the second motor 200. One of the sockets 300 and 302 is for connecting a power cable for supplying power to the second motor 200, and another one of the sockets 300 and 302 is for connecting a signal cable configured to transmit the signals and data from the controller 158 to the second motor 200 and from the second motor 200 to the controller 158. Sockets 304 and 306 are provided on a side of the first motor 130. One of the sockets 304 and 306 is for connecting a power cable for supplying power to the first motor 130, and another one of the sockets 304 and 306 is for connecting a signal cable configured to transmit the signals and data from the controller 158 to the first motor 130 and from the first motor 130 to the controller 158.

A cable 310 is for supplying power to the load cell positioned under the receptacle 140, providing control signals to the load cell, and receiving control signals from the load cell that correspond to the weight measurements of objects.

As illustrated in an embodiment of FIG. 4, the linear guide 202 is disposed on one side with respect to a lower surface 400 of the table 111, in a Y-axis direction. However, it is not limiting, and more than one linear guide may be provided. For example, according to an embodiment, two linear guides operated by one or more motors may be provided on opposing sides of the lower surface 400 of the table 111, or more than two linear guides may be provided spaced apart underneath the lower surface 400 of the table 111, in the Y-axis direction. Alternatively or additionally, one or more linear guides may be provided in an X-axis direction. Also, in an embodiment, one or more linear guides may be provided on an upper side of the table 111, underneath the holder 110.

With continued reference to FIGS. 1, 2A, and 2B, and further reference to FIGS. 5 and 6, the first plurality of containers 224 and the second plurality of containers 226 may hold food items, e.g., food ingredients, for dispensing the food items according to the user's order. For example, the food receptor 632 may be a plate, a bowl, a box, a platter, etc. When the receptacle 140 is placed underneath one of the openings among the first plurality of openings 112 and the second plurality of openings 114, the container corresponding to that opening may dispense food through the opening into the food receptor 632 provided on the receptacle 140.

FIG. 2A illustrates dispensing a food ingredient from a first container among the first plurality of containers 224 at a first dispense position 602 (see FIG. 6), by one of the dispensing motors 170, e.g., the first dispensing motor.

FIG. 2B illustrates dispensing of a food ingredient from a second container among the second plurality of containers 226 at a second dispense position 622 (see FIG. 6) by another one of the dispensing motors 170, e.g., the second dispensing motor (shown in FIG. 1 at the inner side of the carousel apparatus 102). It is noted that, in FIG. 2B, the second dispensing motor is obscured by the second container among the second plurality of containers 226 positioned at the second dispense position 622.

As illustrated, the second container among the second plurality of containers 226 is separated from the first container among the first plurality of containers 224 by a partition formed in the holder 110. The holder 110 is moved by the first motor 130 (shown in FIGS. 1 and 3) to rotate from the first dispense position 602, in order to position the second container among the second plurality of containers 226 at the second dispense position 622.

An outer circular ring illustrated in FIG. 6 represents a first path 600 along which the first plurality of openings 112 is moved when the first motor 130 rotates the holder 110 to bring a specific container among the first plurality of containers 224 to the first dispense position 602 corresponding to a first dispense point 604. An inner ring represents a second path 620 along which the second plurality of openings 114 is moved when the first motor 130 rotates the holder 110 to bring a specific container among the second plurality of containers 226 to the second dispense position 622 corresponding to a second dispense point 624.

In coordination with the first motor 130, the second motor 200 moves the linear guide 202 along a third path 630, to position the food receptor 632 deposited in the receptacle 140 underneath the first dispense point 604 or the second dispense point 624. The first dispense position 602 corresponding to the first dispense point 604 is on an intersection of the first path 600 and the third path 630. The second dispense position 622 corresponding to the second dispense point 624 is on an intersection of the second path 620 and the third path 630. As illustrated in FIG. 6, the third path 630 is inclined toward the shaft 116; however, this is not limiting, and the third path may be implemented to be in parallel to an edge of the table 111.

The controller 158 controls the movements of the linear guide 202, by controlling the second motor 200, to position the receptacle 140 so that a central portion of the food receptor 632 is positioned underneath the first dispense point 604 for the first plurality of containers 224 corresponding to the first plurality of openings 112, or underneath the second dispense point 624 for the second plurality of containers 226 corresponding to the second plurality of openings 114. After the user's order is completed, the receptacle 140 with the food receptor 632 is moved to a user position 634. Various sensors known in the relevant art may be used to verify the position of the food receptor 632. For example, the second motor 200 may be a servomotor with a servo drive, for precision positioning with a feedback function implemented by using at least in part the position readings of the sensors.

As illustrated in FIG. 6, the receptacle 140 with the food receptor 632 may be linearly moved in a Y-axis direction and/or a −Y-axis direction, to be positioned under the first dispense point 604 or the second dispense point 624. For example, when the food receptor 632 is under the first dispense point 604, the controller may control the second motor 200, the linear guide 202, and the dispensing motors 170 so that a corresponding ingredient is dispensed from the container into at least one point on the food receptor 632.

For example, the ingredient may be continuously or intermittently dispensed into more than one point on the food receptor 632, e.g., by moving the receptacle 140 with the food receptor 632 in the Y-axis direction and/or the −Y-axis direction within a predetermined range from the first dispense point 604. For example, the maximum predetermined range may be less than a dimension of the food receptor 632 in the Y-axis direction by a predetermined value. However, this is not limiting. In an embodiment, the receptacle 140 with the food receptor 632 may be linearly moved in an X-axis direction and a −X-axis direction. For example, when the food receptor 632 is under the first dispense point 604, the controller may control the food distribution system 100 so that the ingredient may be continuously or intermittently dispensed from the container in the X-axis direction and/or the −X-axis direction, e.g., by moving another actuator coupled to the receptacle 140 in the X-axis direction and/or the −X-axis direction within a predetermined range from the first dispense point 604 with respect to the X-axis direction. For example, the maximum predetermined range with respect to the X-axis direction may be less a dimension of the food receptor 632 in the X-axis direction by a predetermined value. Additionally, the receptacle 140 positioned under the first dispense point 604 may be rotated by a motor and a drive that are coupled to the support structure 141 and/or the receptacle 140, clockwise and/or counterclockwise, by a full 360 degrees or by a certain angle. As an example, the motor rotating the receptacle 140 may be a stepping motor and may rotate the receptacle 140 360 degrees, more than 360 degrees, or less than 360 degrees. By coordinating movements of the at least one linear axis and a rotational movement, the food ingredient may be dispensed in a spiral or a circle.

Additionally, the food receptor 632 and/or the receptacle 140 may be subjected to shaking. For example, the shaking may be achieved by a relatively fast back and forth movement of the linear guide 202, to improve ingredient distribution and level out the ingredients. For example, while the food receptor 632 supported by the receptacle 140 is positioned at a dispense position among the first dispense position 602 or the second dispense position 622, for being filled with the food ingredients from a container among the first plurality of containers or among the second plurality of containers, the second motor 200 is controlled to perform a back and forth movement of the receptacle 140 a number of times along the third path 630 of the linear guide 202 by a predetermined distance in each direction. For example, the number of times may be 1, 2, 3, 4, . . . , 20.

The shaking may allow for a better distribution and fuller loading of the food receptor 632 without spills. This also may allow the machine to mimic the manual motion of tapping on the bowl to allow the bowl to settle some of the ingredients, e.g., lettuce and grains. Thus, by controlling the ingredient distribution, it is possible to ensure that the top of the food portion is relatively flat to allow the fully loaded food receptor 632 to clear the opening 144 without hitting the housing 106 at the top of the opening 144.

For example, a food dispensing operation may be performed at a dispense position among the first dispense position 602 or the second dispense position 622 from at least one container among the first plurality of containers 224 or among the second plurality of containers 226, respectively, by performing at least one of rotating the receptacle 140 positioned at the dispense position, moving the receptacle 140 positioned at the dispense position along the third path 630 of the linear guide 202, moving the receptacle 140 positioned at the dispense position perpendicular to the third path 630 of the linear guide 202, or shaking the receptacle 140 positioned at the dispense position.

The described-above equally pertains to controlling with respect to the food receptor 632 positioned under the second dispense point 624.

In an embodiment, different shapes and patterns of ingredient distribution may be achieved by using the above-described movements of the receptacle 140. Lines, points, and shapes may be used, as for example, created by combining lines and points, as in rastering. Also, various distributions may be achieved, as varying amounts of ingredients depending on the above-described shapes. Examples of the distribution include even distribution (flat) vs normal distribution (bell curve) vs point distribution; however, these examples are not limiting. By allowing a flexible positioning of the food receptor 632, the food distribution system 100 is capable of placing and distributing the food ingredients more accurately and evenly.

In an embodiment, the receptacle 140 may be adjustable by accommodating the food receptor 632 of different sizes, for example, to support a portion of the same dish of a small size, or a large size that is larger than the small size. However, the sizes for the food receptor 632 are not limiting and may be medium, extra-large, etc. For example, the receptacle 140 is configured to hold the food receptor 632 of different sizes so that a distance from the first dispense point 604 to a predetermined point on the food receptor 632 disposed under the first dispense point 604 or from the second dispense point 624 to a predetermined point on the food receptor 632 positioned under the second dispense point 624 is within a predetermined range. For example, a spacer may be inserted under the receptacle 140 or under the food receptor 632, to adjust the distance from the food receptor 632 to the first dispense point 604 or the second dispense point 624. As another example, the receptacle 140 may be automatically changed based on the user selection of the size for the food receptor 632. As another example, in the case when more than one linear guide is provided as described above, a plurality of receptacles 140 may be provided which may simultaneously have different sizes at separate locations to receive different sizes or shapes of the food receptor 632.

As described above, the load cell is disposed in the load cell housing 150 underneath the receptacle 140, to measure the weight of the object which provides a load on the load cell. In an embodiment, the weight of the receptacle 140 may be known or may be determined from the readings provided by the load cell. When the food receptor 632 of a particular size is selected by the user and placed in the receptacle 140, the load cell may detect a weight of the selected food receptor placed into the receptacle 140. Knowing the weight of the receptacle 140 and the food receptor 632 allows the food distribution system 100 to control a correct weight of the food ingredients being dispensed from the first plurality of containers 224 and the second plurality of containers from 226, by taking into consideration the readings from the load cell that correspond to the signals received by the controller 158 from the load cell.

Although only two rows of containers are illustrated and described with reference to an embodiment, a number of the rows is not limited and may be 3, 4, 5, . . . 10. Further, the first plurality of openings 112 and the second plurality of openings 114 are illustrated to have a trapezoid shape in FIGS. 2A and 2B; however, an embodiment is not limited thereto and a shape of the first plurality of openings 112 and the second plurality of openings 114 may be selected to correspond to a shape of the first plurality of containers 224 and the second plurality of containers 226, e.g., circular, square, oval, etc. Additionally, the shape and the size of the cross-section of individual openings may be the same or different, in correspondence to the containers being used.

In an embodiment, the user may select the food receptor 632 of a desired size and place the food receptor 632 into the receptacle 140 at the user position 634. Otherwise, the user may select the desired size of the food receptor 632 through the UI 160 and the food receptor 632 may be placed into the receptacle 140 automatically or by a user at the user position 634. However, this is not limiting. In an embodiment, one or more food receptor holders may be provided within the housing 106. The food receptor holder may dispense a food receptor 632 of a size selected by a user and position the food receptor 632 into the receptacle 140 within the housing

106. For example, the actuator or another mechanism may be provided that separates the food receptor 632 from the stack of the food receptors and drops the food receptor 632 into the receptacle 140, to be filled.

The user may select the food ingredients to be dispensed into the food receptor 632, via the UI 160. In an embodiment, the UI 160 may be disposed on the top of the housing 106; however, a position of the UI 160 is not specifically restricted. For example, in an embodiment, the UI 160 may be installed in the housing door 107 of the housing 106. The UI 160 may be a touch screen and may display a graphical UI (GUI) containing various information. For example, the user may input various commands for controlling the food distribution system 100 through the GUI. For example, the GUI may be configured to display food menus from which the user may select a dish, e.g., a salad. After a user provides a selection of the dish, various food ingredients for composing the dish may be further displayed. However, this is not limiting and a step of displaying the menu may be omitted.

Continuing with an example of the salad being selected by the user, various food ingredients or groups of food ingredients may be displayed on the GUI. Examples of groups of the food ingredients include leafy greens, vegetables, fruits, berries, grains, nuts, dressing, etc. Each group of the food ingredients may further include ingredients belonging to that group that may be displayed as a pull-down menu, icons, etc. The user may provide inputs through the GUI to select the desired food ingredients. The controller 158 determines a list order in which the food ingredients are dispensed, to minimize an amount of time to complete the user order and/or improve the dish taste or appearance.

For example, the first plurality of containers 224 corresponding to the first plurality of openings 112 may contain the base food ingredients, as for example, greens, grains, macaroni, etc., which may be different from each other in each of the first plurality of containers 224 or the same in at least some of the first plurality of containers 224. However, this is not limiting. For example, the first plurality of containers 224 may contain the supplemental food ingredients, as for example, dressings, bacon, nuts, berries, etc., which may be different from each other in each of the first plurality of containers 224 or the same in at least some of the first plurality of containers 224. As another example, one or more of the first plurality of containers 224 may contain the base food ingredients, one or more of the first plurality of containers 224 may contain the supplemental food ingredients, and one or more of the first plurality of containers 224 may contain beverages.

The second plurality of containers 226 corresponding to the second plurality of openings 114 may contain the supplemental food ingredients, which may be different from each other in each of the second plurality of containers 226 or the same in at least some of the second plurality of containers 226. However, this is not limiting. For example, the second plurality of containers 226 may contain the base food ingredients which may be different from each other in each of the second plurality of containers 226 or the same in at least some of the second plurality of containers 226. As another example, one or more of the second plurality of containers 226 may contain the base food ingredients, one or more of the second plurality of containers 226 may contain the supplemental food ingredients, and one or more of the second plurality of containers 226 may contain beverages.

For example, if the user selects spinach, tomatoes, and yogurt dressing for the salad, the carousel apparatus 102 may be controlled to rotate around the shaft 116, to successively position the specific openings, into which the containers containing the spinach, tomatoes, and yogurt dressing are inserted, over the third path 630 of the linear guide 202. In an example, the determined order of ingredients distribution according to the user order is the spinach, tomatoes, and yogurt dressing, the container containing the spinach corresponds to a first opening of the first plurality of openings 112, the container containing the tomatoes corresponds to a second opening of the first plurality of openings 112, and the container containing the yogurt dressing corresponds to a third opening of the second plurality of openings 114. The controller 158 controls the food distribution system 100 so that the carousel apparatus 102 rotates to position the first opening on the third path 630 and the linear actuator apparatus 104 brings the receptacle 140 to the first dispense position 602 to dispense the spinach. Then, the carousel apparatus 102 rotates to position the second opening on the third path 630 to dispense tomatoes at the first dispense position 602. After that, the carousel apparatus 102 rotates to position the third opening on the third path 630 and the linear actuator apparatus 104 brings the receptacle 140 to the second dispense position 622 to dispense the yogurt dressing. However, an order of dispensing of the food ingredients and an order of moving the carousel apparatus 102 and the linear actuator apparatus 104 are not limited to the above-described.

The linear actuator apparatus 104 may be controlled to successively deliver the support structure 141 holding the receptacle 140 with the food receptor 632 underneath the specific openings for the spinach, tomatoes, and yogurt dressing to be dispensed. In this manner, the carousel apparatus 102 and the linear actuator apparatus 104 cooperate to fulfill the user's order.

FIG. 7A is a perspective illustration of a portion of the linear actuator apparatus 104 according to an embodiment, and FIG. 7B illustrates a bottom view of a portion of the linear actuator apparatus of the food distribution system according to an embodiment.

With reference to FIGS. 7A and 7B, the linear guide 202 includes a rail structure 700 facing the second motor 200 and including rails 702 on opposing sides of the rail structure, in a lengthwise direction of the rail structure. For assembly, a spacer 712 is fastened to a rail stiffener 720 using fasteners 722, and the rail stiffener 720 is fastened to the rail structure 700 by fasteners 724. A front cover 730 is mounted on a front side of the linear actuator apparatus 104 by using fasteners 732, and a motor cover 736 is mounted to cover the second motor 200 by using fasteners 738. The carriage 212 is coupled to the rail structure 700 by bearings 740 which are slidable on the rails 702 and disposed at each corner of the carriage 212. However, this is not limiting, and the bearings 740 may be disposed at only some of the corners of the carriage 212. The carriage is movable on the rails 702 by a belt/pulley assembly 750 disposed on an underside of the rail structure 700 and operable by the second motor 200. However, the method and the order of the assembly described above is not limiting.

Any fastening device may be used as the fasteners 722, 724, 732, and 738, for example, bolts, screws, nuts, etc., which may be installed into corresponding openings.

Figure 8:
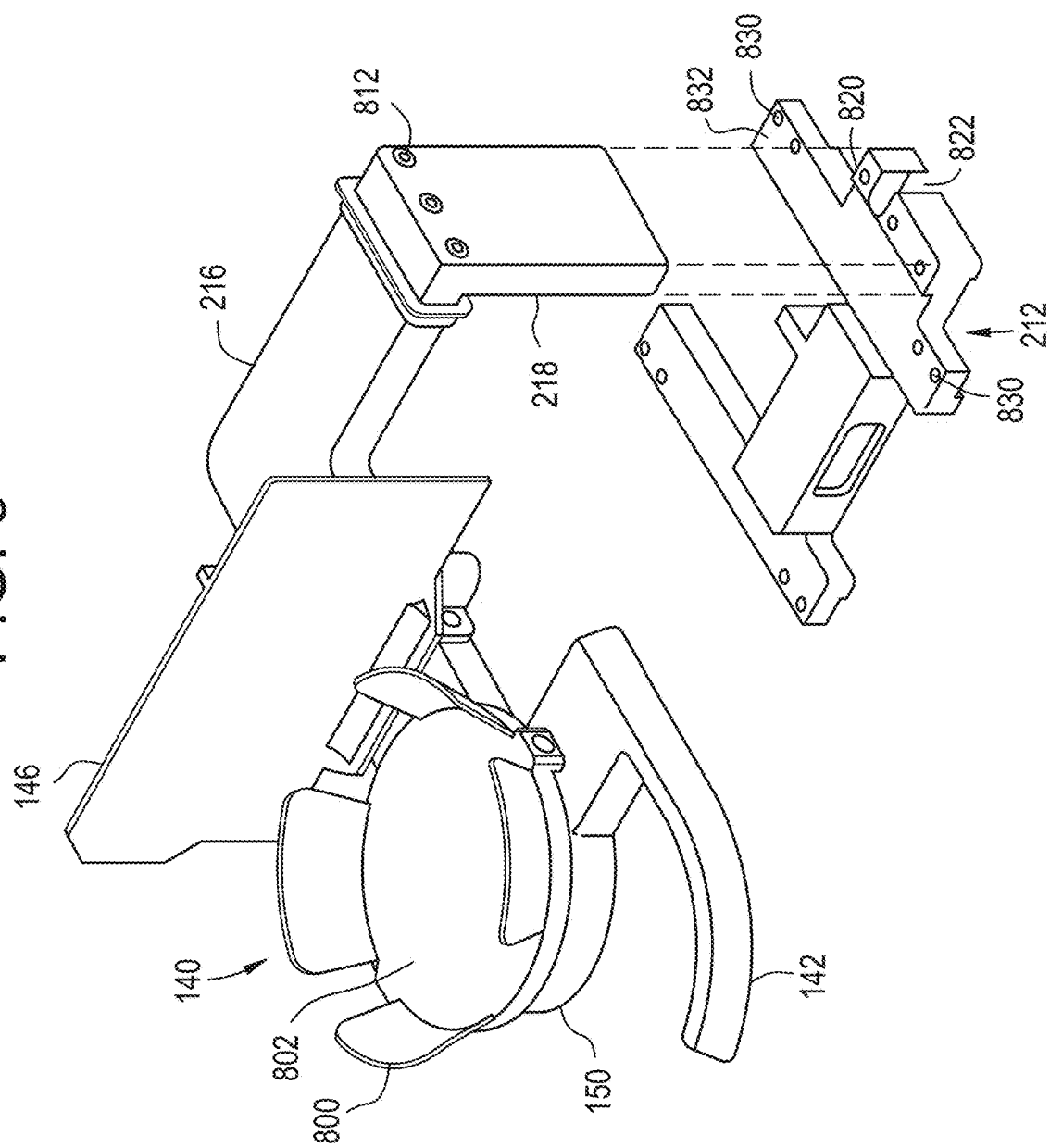
FIG. 8 illustrates a perspective view of a portion of the food distribution system according to an embodiment.

FIG. 8 illustrates a perspective view of a portion of the food distribution system according to an embodiment.

With reference to FIG. 8, the receptacle 140 includes raised side portions 800 and a bottom portion 802. The food receptor 632 described above may be positioned on the bottom portion 802, manually or automatically. However, this is not limiting and, in an embodiment, a spacer may be disposed under the food receptor 632. Also, in an embodiment, the bottom portion 802 may be planar or curved, for example to follow a shape of the food receptor 632. The bracket 216 may have an L shape and extend from the load cell housing 150 underneath the shielding plate 146. The arm 218 is fixed to the bracket 216 by screw or screws 812 and has an L shape.

FIG. 8 shows a top side of the carriage 212, which is to be mounted facing the underside of the linear guide 202. Smaller diameter mounting through-holes 820 are provided to connect the carriage 212 to the arm 218. A bigger diameter through-hole 822 is provided to pass on the cable 310 to the load cell in the load cell housing 150 through the cable path provided in the arm 218 and the bracket 216. The bearings 740 shown in FIG. 7A are mounted to openings 830 provided at the corners of an upper surface 832 of the carriage 212 and are secured by fasteners inserted through the openings 830 from underneath the carriage 212.

FIG. 9 illustrates a flowchart of a method for using a food distribution system according to an embodiment.

In operation 900, the controller 158 may receive, through the UI 160, a user input selecting a size of the food receptor 632. For example, the user input may be received through the GUI displayed on the UI 160, a physical button, etc., and the food receptor 632 may be placed into the receptacle 140 automatically or manually. Operation 900 may be omitted, and the user may obtain the food receptor 632 manually.

In operation 904, the controller 158 may control the UI 160 to display a menu or menus on the GUI.

In operation 910, the controller 158 may receive, through the UI, a user input selecting a dish in the menu. Operations 904 and 910 may be omitted.

In operation 914, the controller 158 may control the UI 160 to display food ingredients, as described above.

In operation 920, the controller 158 may receive, through the UI 160, a user input selecting one or more food ingredients.

In operation 924, the controller 158 may determine a list order by which the food ingredients selected by the user will be dispensed into the food receptor 632.

In operation 926, the controller 158 may determine whether a container containing a first food ingredient from the list order is lined up for dispensing underneath one among the first plurality of containers 224 corresponding to one of the first plurality of openings 112 or one among the second plurality of containers 226 corresponding to one of the second plurality of openings 114.

If the controller 158 determines that the container containing the first food ingredient is lined up for dispensing (YES in operation 926), the method proceeds to operation 934. If the controller 158 determines that the container containing the first food ingredient is not lined up for dispensing (NO in operation 926), the method proceeds to operation 932.

In operation 932, the controller 158 may control the first motor 130 to rotate the holder 110 around the shaft 116, to bring an opening among the first plurality of openings 112 or among the second plurality of openings 114 into which the container containing the first food ingredient is inserted, among the first plurality of containers 224 or among the second plurality of containers 226, to the first dispense position 602 or to the second dispense position 622, respectively, that is on the intersection of the first path 600 and the third path 630, as illustrated in FIG. 6.

In operation 934, the controller 158 may control the second motor 200 to move the linear guide 202 along the third path 630 to the first dispense position 602 or the second dispense position 622, in correspondence to operation 932.

In an embodiment, prior to performing operation 932, the controller 158 may determine whether the first food ingredient is to be dispensed at the first dispense position 602 or the second dispense position 622, and an order of operations 932 and 934 may be reversed or operations 932 and 934 may be performed in parallel.

In operation 940, the controller 158 may control one of the dispensing motors 170 to dispense the first food ingredient into the food receptor 632 while checking the weight of the first food ingredient using the load cell as described above.

In operation 944, the controller 158 may determine whether the list order contains more food ingredients to be dispensed.

If the controller 158 determines that the list order does not contain more food ingredients to be dispensed (NO in operation 944), the method proceeds to operation 950.

In operation 950, the controller 158 may control the second motor 200 to move the linear guide 202 forward along the third path 630 to the user position 634, as illustrated in FIG. 6. With the linear guide 202 being moved forward toward the exterior of the housing 106, the protruding structure 142 pushes the access door 143 open so that the food receptor 632 with the assembled dish is presented to the customer through the opening 144.

If the controller 158 determines that the list order contains more food ingredients to be dispensed (YES in operation 944), the method proceeds to operation 954.

In operation 954, the controller 158 may determine whether a container containing the next food ingredient from the list order is among the first plurality of containers 224 corresponding to the first plurality of openings 112 or among the second plurality of containers 226 corresponding to the second plurality of openings 114.

If the controller 158 determines that the container containing the next food ingredient is among the second plurality of containers 226 (NO in operation 954), the method proceeds to operation 970. If the controller 158 determines that the container containing the next food ingredient is among the first plurality of containers 224 (YES in operation 954), the method proceeds to operation 962.

In operation 970, the controller 158 may control the first motor 130 to rotate the holder 110 around the shaft 116, to bring the opening among the second plurality of openings 114 into which the container containing the next food ingredient is inserted, among the second plurality of containers 226, to the second dispense position 622.

In operation 974, the controller 158 may control the second motor 200 to move the linear guide 202 along the third path 630 to the second dispense position 622 and the method proceeds to operation 980. The movements described with reference to operations 970 and 974 may be reversed or performed in parallel.

In operation 962, the controller 158 may control the first motor 130 to rotate the holder 110 around the shaft 116, to bring an opening among the first plurality of openings 112 into which the container containing the next food ingredient is inserted, among the first plurality of containers 224, to the first dispense position 602 and the method proceeds to operation 980.

In operation 980, the controller 158 may control one of the dispensing motors 170 to dispense the next food ingredient into the food receptor 632 positioned at the first dispense position 602 or the second dispense position 622 in correspondence to performing the operation 962 or operation 974, while checking the weight of the first food ingredient using the load cell.

In operation 984, the controller 158 may determine whether the list order contains more food ingredients to be dispensed.

If the controller 158 determines that the list order does not contain more food ingredients to be dispensed (NO in operation 984), the method proceeds to operation 950 described above. If the controller 158 determines that the list order contains more food ingredients to be dispensed (YES in operation 984), the method proceeds to operation 954 described above.

The above-described order of operations is not limiting or necessarily performed in the above-described order. For example, some of the operations may be performed in a reverse order or at the same time. Further, some of the operations may be omitted or other operations may be added. Additionally, at least some of the user inputs may be received wirelessly, as for example, from a user device communicatively connected to a wireless and/or wired interface provided in the controller 158. For example, a mobile device may be communicatively connected to the controller 158 and serve as a user interface for the food distribution system 100.

As described above, in an embodiment, the linear actuator apparatus 104 allows for more accurate positioning of the receptacle 140 with the food receptor 632 under the containers holding the food ingredients. For example, moving the food receptor 632 in at least two opposing directions allows for a plurality of different positional dispenses into the food receptor 632 at each of the dispense positions, as for example, the dispensing may be performed at one side, in the center, and at another side of the food receptor 632. As another example, the food ingredient may be dispensed in a line or in a pattern. In an embodiment, since each of the positions of the food dispensing may be accurately targeted based on the central portion of the food receptor 632, physical dimensions of the food receptor may be decreased. For example, it is possible to use a bowl smaller than 32 ounces without causing the food to spill over. As another example, it is possible to use a drink cup having a smaller opening.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A system comprising:
    a carousel apparatus comprising:
        a first plurality of openings concentrically arranged around an axis and adapted to hold a first plurality of containers, respectively, the first plurality of containers being adapted to hold first food ingredients,
        a second plurality of openings concentrically arranged inside the first plurality of openings and adapted to hold a second plurality of containers, respectively, the second plurality of containers being adapted to hold second food ingredients,
        a holder in which the first plurality of openings and the second plurality of openings are formed, and which is adapted to support the first plurality of containers and the second plurality of containers, and
        a first motor coupled to the holder and adapted to rotate the holder around the axis;
    a support structure configured to hold a receptacle; and
    a linear actuator apparatus configured to move the support structure and comprising:
        a linear guide which extends underneath the holder and is coupled to the support structure, and
        a second motor coupled to the linear guide and adapted to move the support structure along the linear guide underneath the first plurality of openings and the second plurality of openings.

2. The system of claim 1, further comprising a housing that houses the carousel apparatus and the linear actuator apparatus,
    wherein the housing comprises an opening and an access door configured to cover the opening, the opening being positioned to allow the support structure to pass through the opening and present the receptacle on the support structure to a user.

3. The system of claim 2, further comprising a protruding structure which is connected to the support structure and protrudes in a forward direction toward an exterior of the housing,
    wherein the protruding structure is configured to push the access door open by being brought on the support structure in the forward direction.

4. The system of claim 1, wherein the receptacle comprises a planar bottom portion and a plurality of raised side portions.

5. The system of claim 1, further comprising:
    a table structure arranged under the first plurality of openings and the second plurality of openings and configured to support the carousel apparatus and the linear actuator apparatus.

6. The system of claim 5, wherein the linear actuator apparatus further comprises an arm that connects the support structure and the linear guide, the arm being proximate to an edge of the table structure.

7. The system of claim 1, wherein the receptacle is configured to hold at least one of a cup, a plate, or a bowl.

8. The system of claim 1, wherein the first plurality of containers contains at least one from among one or more base food ingredients, one or more supplemental food ingredients, and one or more beverages, among the first food ingredients, and the second plurality of containers contains at least one from among one or more base food ingredients, one or more supplemental food ingredients, and one or more beverages, among the second food ingredients.

9. The system of claim 1, wherein the receptacle is configured to support a food receptor into which at least one food ingredient is dispensed from at least one container being included in the first plurality of containers or the second plurality of containers, and
    wherein the food receptor is configured to support the at least one food ingredient being dispensed.

10. The system of claim 1, wherein the receptacle is configured to be rotatable.

11. The system of claim 10, wherein the receptacle is further configured to rotate 360 degrees or more.

12. The system of claim 1, further comprising:
    a controller configured to control the carousel apparatus and the linear actuator apparatus; and
    a user interface (UI) configured to display a menu and receive a user input.

13. The system of claim 12, wherein:
the display is further configured to display a graphical UI (GUI) displaying a plurality of food ingredients for composing a dish, and
the controller is further configured to:
receive a user input selecting one or more food ingredients among the plurality of food ingredients through the GUI, the one or more food ingredients being included into at least one of the first food ingredients or the second food ingredients that are held in the first plurality of containers and the second plurality of containers, and
based on the one or more food ingredients being selected, determine a list order of dispensing the one or more food ingredients from the first plurality of containers and the second plurality of containers.

14. The system of claim 13, wherein the controller is further configured to control the first motor to rotate the holder, and control the second motor to move the linear guide, to linearly bring the receptacle on the support structure to one of a first dispense position or a second dispense position, for dispensing the one or more food ingredients in the list order.

15. The system of claim 14, wherein the list order comprises a first food ingredient among the one or more food ingredients that is contained in one of the first plurality of containers and a second food ingredient among the one or more food ingredients that is contained in one of the second plurality of containers, and
the controller is further configured to:
determine whether the one of the first plurality of containers is at the first dispense position,
based on the determining that the one of the first plurality of containers is not at the first dispense position, control the first motor to rotate the holder to position the one of the first plurality of containers at the first dispense position,
based on the one of the first plurality of containers being at the first dispense position, control the second motor to move the linear guide to position the receptacle at the first dispense position, and
control a first dispensing motor of a plurality of dispensing motors to dispense the first food ingredient into a food receptor supported by the receptacle,
after completion the dispensing the first food ingredient:
control the first motor to rotate the holder to position the one of the second plurality of containers at the second dispense position,
control the second motor to move the linear guide to position the receptacle at the second dispense position, and
control a second dispensing motor of the plurality of dispensing motors to dispense the second food ingredient into the food receptor, and
after completion the dispensing the second food ingredient, control the second motor to move the linear guide to position the receptacle with the food receptor at an opening for a user to pick up the food receptor, the opening being formed in a housing that houses the carousel apparatus and the linear actuator apparatus.

16. A method for using a system including a carousel apparatus including a first plurality of openings concentrically arranged around an axis and adapted to hold a first plurality of containers, respectively, the first plurality of containers being adapted to hold first food ingredients, a second plurality of openings concentrically arranged inside the first plurality of openings and adapted to hold a second plurality of containers, respectively, the second plurality of containers being adapted to hold second food ingredients, a holder in which the first plurality of openings and the second plurality of openings are formed, and which is adapted to support the first plurality of containers and the second plurality of containers, and a first motor coupled to the holder and adapted to rotate the holder around the axis; a support structure configured to hold a receptacle; and a linear actuator apparatus configured to move the support structure and including: a linear guide which extends underneath the holder and is coupled to the support structure, and a second motor coupled to the linear guide and adapted to move the support structure along the linear guide underneath the first plurality of openings and the second plurality of openings, the method comprising:
rotating, by the first motor, the holder around the axis; and
moving, by the second motor, the support structure holding the receptacle along the linear guide underneath the first plurality of openings and the second plurality of openings.

17. The method of claim 16, further comprising:
prior to the rotating the holder, receiving a user input which selects a food receptor of a desired size;
receiving the food receptor in the receptacle; and
moving, by the second motor, the support structure with the receptacle and the food receptor to at least one dispense position corresponding to a least one food dispense point among a plurality of dispense positions, the plurality of dispense positions corresponding to a plurality of dispense points on a path of the linear guide.

18. The method of claim 17, wherein the plurality of dispense positions includes a first dispense position and a second dispense position spaced apart from the first dispense position, and
wherein the method further comprises:
prior to the rotating the holder, displaying, on a display of the system, a plurality of food ingredients,
receiving, through a user input unit of the system, a user input selecting a first food ingredient and a second food ingredient among the plurality of food ingredients, the first food ingredient being in one of the first plurality of containers and the second food ingredient being in one of the second plurality of containers,
determining whether the one of the first plurality of containers is at the first dispense position,
based on the determining that the one of the first plurality of containers is not at the first dispense position, rotating, by the first motor, the holder to position one of the plurality of first openings that corresponds to the one of the first plurality of containers over the first dispense position,
based on the one of the first plurality of containers being at the first dispense position, moving, by the second motor, the support structure holding the receptacle along the path of the linear guide to position the receptacle at the first dispense position, and
controlling a first dispensing motor of a plurality of dispensing motors to dispense the first food ingredient into the food receptor supported by the receptacle.

19. The method of claim 18, further comprising:
determining that dispensing of the first food ingredient is completed,
based on the determining that the dispensing of the first food ingredient is completed, rotating, by the first motor, the holder to position one of the second plurality of openings that corresponds to the one of the second plurality of containers over the second dispense position,
moving, by the second motor, the support structure holding the receptacle along the path of the linear guide to position the receptacle at the second dispense position, and
controlling a second dispensing motor of the plurality of dispensing motors to dispense the second food ingredient into the food receptor.

20. The method of claim 19, wherein a protruding structure is provided to the support structure, the protruding structure protruding toward a housing that houses the carousel apparatus and the linear actuator apparatus, and
wherein the method further comprises:
moving, by the second motor, the support structure holding the receptacle along the linear guide toward the housing, and
opening an access door by a force applied by the protruding structure, for a user to pick up the food receptor.

21. The method of claim 17, further comprising:
controlling a dispensing motor to perform a food dispensing operation into the food receptor supported by the receptacle positioned at the at least one dispense position from at least one container among the first plurality of containers or among the second plurality of containers, while controlling the second motor to perform a back and forth movement of the receptacle a number of times along the path of the linear guide by a predetermined distance in each direction,
wherein the number of times that the back and forth movement is performed is at least 1.

22. The method of claim 17, wherein the receiving the food receptor in the receptacle further comprises:
dispensing the food receptor into the receptacle automatically, inside or outside a housing that houses the carousel apparatus and the linear actuator apparatus.

* * * * *